Oct. 30, 1962     P. LAVALLEE     3,061,477

FILTERING APPARATUS

Filed Nov. 5, 1959     2 Sheets-Sheet 1

INVENTOR:
Paul Lavallée

BY

AGENT.

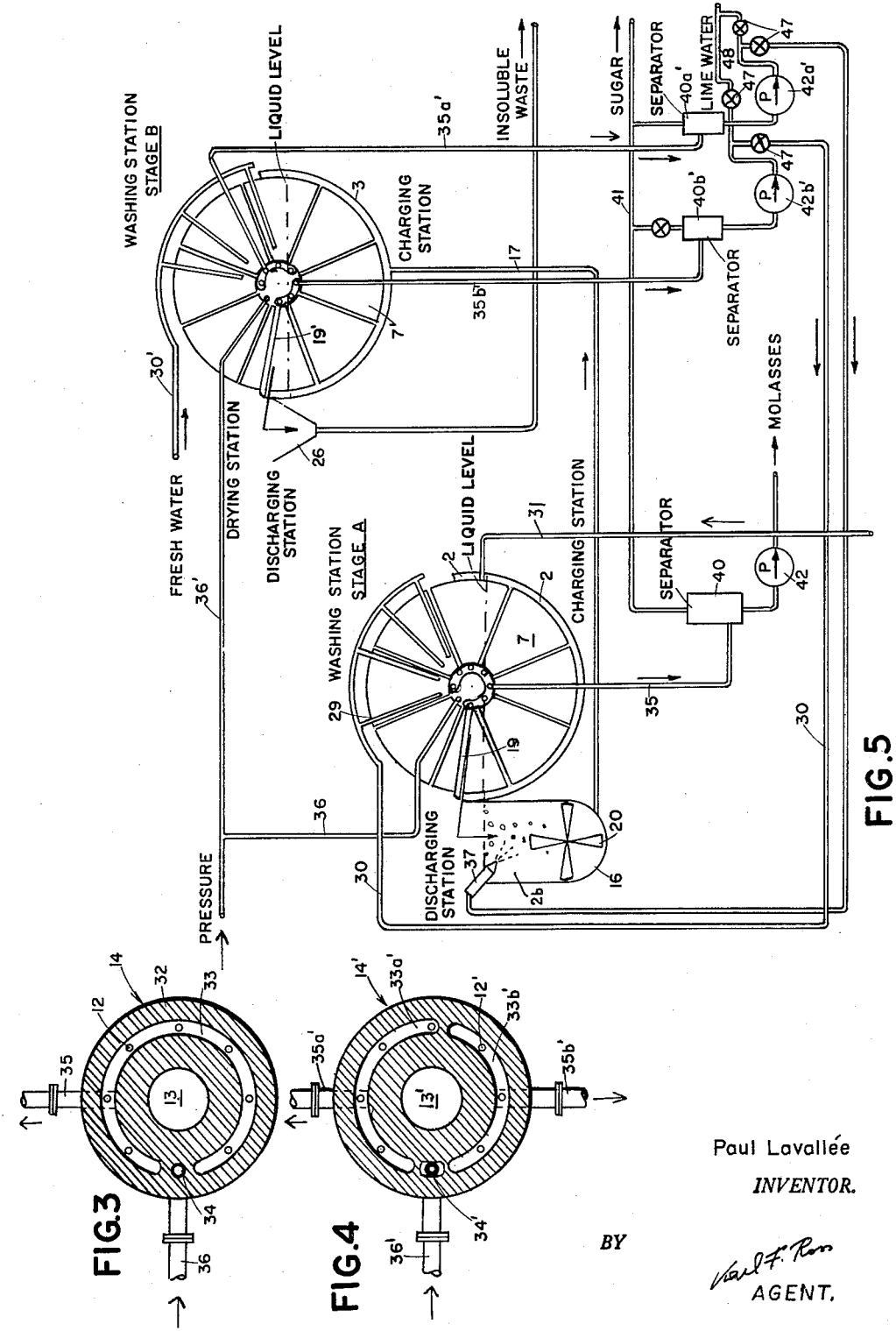

United States Patent Office 3,061,477
Patented Oct. 30, 1962

3,061,477
FILTERING APPARATUS
Paul Lavallee, Paris, France, assignor to
Guy Gaudfrin, Sceaux, France
Filed Nov. 5, 1959, Ser. No. 851,172
Claims priority, application France Nov. 7, 1958
5 Claims. (Cl. 127—9)

My present invention relates to an apparatus for filtering a liquor containing insoluble matter in suspension, particularly (but not exclusively) a heavy sirup as obtained in sugar refining from the raw juice of crushed beets or cane by decanting, evaporation or filtration, e.g. in an apparatus as disclosed in my copending application Ser. No. 837,914, filed September 3, 1959.

The aforementioned heavy sirup is rich in sugar crystals as well as insoluble matter, the latter resulting mainly from the reaction of undesirable acids with a suitable purifier (usually lime) added to the raw juice. Separation of the sugar from the insolubles and from the residual lime water requires washing and filtering operations, the filtering being conventionally carried out by centrifuging in perforated drums. This process, even when performed with a considerable excess of wash water over the theoretical amount needed for complete solubilization of the sugar content of the sirup, is only partially effective since the water will naturally seek paths of least resistance through the mass to be filtered and will thus bypass some of its denser portions. To provide more than one stage of centrifugation is, on the other hand, rather uneconomical because of the high cost of such equipment.

It is, therefore, a principal object of my present invention to provide apparatus for more efficiently leaching out the dissolved components of a liquor such as, for example, the sirup referred to above.

A more specific object of my invention is to provide means for recovering the so-called "first" sugar from a heavy sirup in more concentrated form, thus with the use of less wash water than was heretofore necessary for this purpose.

Another specific object of this invention is to provide simplified equipment for multi-stage filtering of refinery sirup or the like to insure a substantially uniform extraction of solubles from the treated material, thus insuring a maximum yield.

A further object of the instant invention is to provide an improved washing and filtering device in which individual filter portions can be conveniently and rapidly removed for repair or replacement.

It is also an object of the invention to provide means for effectively clearing the insoluble residue from the filtering surface during operation of the apparatus, thus obviating the need for repeatedly arresting same to remove molasses or other sludge.

In accordance with a feature of the present invention I provide a washing and filtering device consisting, essentially, of a vessel containing one or more disks each composed of a plurality of angularly adjoining, mutually separated filter sectors which, in the course of a revolution of the disk, are successively submerged in and removed from the liquor to be treated whereby each sector passes through a series of operating stations such as a charging and filtering station, a washing station and a discharging station; a drying station may be interposed between the two last-mentioned stations; each station includes one or more positions either above or below the liquor lever in the vessel. Each filter sector has a chamber communicating with the interior of the vessel only through the interstices of its filter screen and is, advantageously, independently removable from the shaft of the disk which is traversed by a plurality of passages respectively leading to the chambers of the several filter sectors. Through these passages, suction may be applied to each filter sector in its charging and washing positions whereas pressure is applied at the discharging station, this pressure serving to dislodge the filter cake from the outer surface of the sector after the fluids present therein and/or admixed with it have been drawn off.

Another feature of my invention resides in the subdivision of the above-described washing and filtering device into a plurality of axially separated sections representing different stages of operation, each section containing one or more disks of the type just set forth. A washing agent or lixiviant, conveniently starting out as ordinary water, is conducted in counterflow through these stages so as to arrive at the first stage as an already enriched liquor containing dissolved filtrate. Part of the washing agent, enriched after its passage through the filtering device, may also be used to redilute the sludge from a preceding stage preparatorily to its filtering and washing in a succeeding stage. I have found that a two-stage apparatus of this description will be satisfactory for most purposes.

The above and other objects, features and advantages of my invention will become more fully apparent from the following detailed description of a preferred embodiment, reference being made to the accompanying drawing in which:

FIGS. 3 and 4 are sectional detail views respectively taken on lines III—III and IV—IV of FIG. 1; and FIG. 5 is a somewhat diagrammatic overall view of the device, illustrating its mode of operation.

Figure 1:
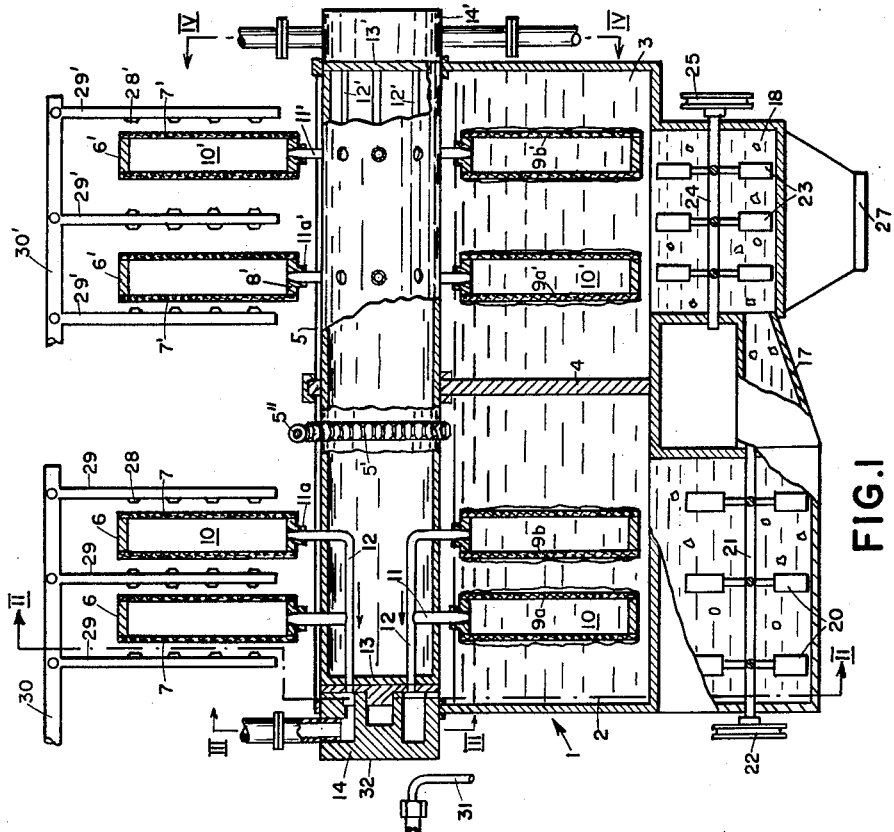
FIG. 1 shows, mostly in axial section, a two-stage filtering and washing device according to the invention.
Figure 2:
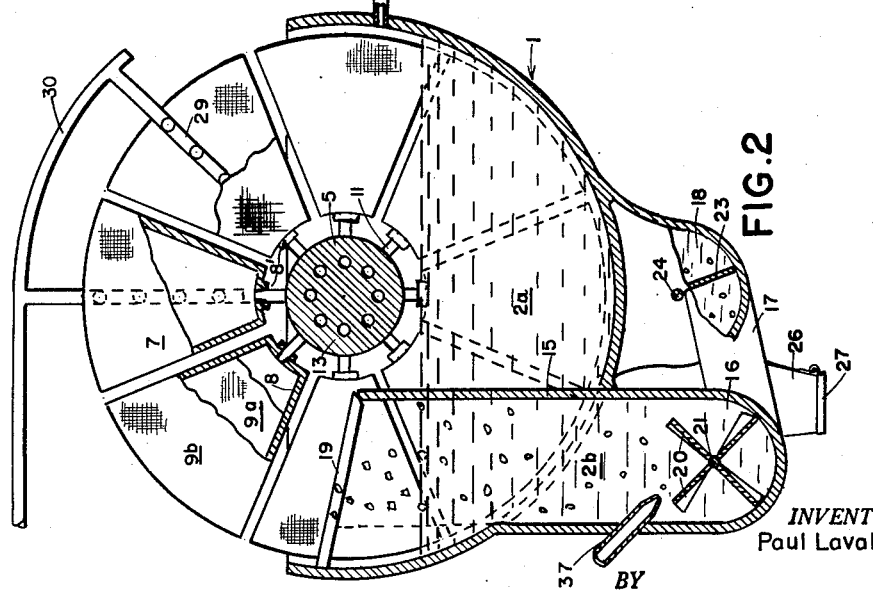
FIG. 2 is a cross-sectional view taken substantially on the line II—II of FIG. 1.

In the drawing I show a tank 1 divided into a pair of compartments 2, 3 by a water-tight bulkhead 4. Each of the compartments 2, 3 constitutes one stage of a two-stage filtering and washing apparatus, compartment 2 defining a first stage A and compartment 3 defining a second stage B. The walls of the tank 1 and the bulkhead 4 support a drive shaft 5 which is rotated by a worm gear 5' meshing with a form 5'', the latter being driven by a motor not shown. The shaft 5 carries two sets of filter disks 6,6', each set comprising a pair of disks divided into eight individually removable filtering sectors 7, 7'. The angularly adjoining, mutually separated sectors 7, 7' are composed of frames 8, 8' upon which filter cloth is stretched to form a pair of filtering faces 9a, 9b and 9a', 9b' on each sector. The faces 9a, 9b and 9a', 9b' enclose chambers 10, 10' which communicate via pipes 11, 11' with tubes 12, 12' terminating respectively in plates 13, 13' of a distributing head 14 at the left side of FIG. 2 and in another such head 14' on the right side of the figure. The sectors 7, 7' are further provided with bosses 11a, 11a' which have tapered bores adapted removably to secure the sectors to the correspondingly tapered extremities of the pipes 11, 11' with a friction fit. It will be noted that primed reference numerals designate elements within compartment 3 and stage B which correspond to the elements indicated with identical, though unprimed, numerals in compartment 2 and stage A. There are eight tubes 12 and 12', corresponding to the eight sectors 7 and 7' of the filter disks, each tube interconnecting two angularly aligned sectors 7 or 7' on shaft 5. The compartment 2 is further subdivided by a partition 15, broken to permit the passage of the filter disks, into a filtering section 2a and a collector section 2b terminating in a well 16 which communicates via a pipe 17 with a similar well 18 depending from compartment 3 and opening into the latter. The partition 15 carries a plurality of stripper blades 19 positioned to scrape an accumulated deposit from respective filter faces 9a, 9b of the sectors 7. The well 16 is provided with a slurry-transfer and agitating device in the form of vanes 20 which are carried upon a shaft 21 journaled in the front and rear walls of the well 16 and driven by a pulley 22 from a motor not shown. Similarly, the well 18 is provided wtih an agitating device comprising vanes 23 which are mounted upon a shaft 24 driven in like manner via a pulley 25. Compartment 3 is provided with stripper blades 19' (schematically shown in FIG. 5) positioned to clear an accumulated deposit from filter faces 9a', 9b' and to guide the removed sludge to a drain 26 having a hinged door 27. Each filter disk is adapted to rotate in a plane along which there are angularly spaced a charging station, a washing station and a discharging station. The filter disks of stage B rotate, in addition, past a drying station. These processing stations will be more fully described with reference to FIG. 5. Each sector, in passing its washing station, moves between spray nozzles 28 or 28' carried upon pipes 29 or 29' which communicate with a main spray pipe 30 or 30'. An inlet pipe 31, adapted to deliver a heavy sirup containing matter in suspension from a preceding concentration stage not shown, communicates with compartment 2 through a side wall thereof.

The distributing head 14, best seen in FIG. 3, comprises a block 32 within which plate 13 is rotatably journaled and which is provided with an incompletely annular channel 33, communicating simultaneously with seven of the eight terminations of tubes 12 in plate 13, and with a port 34 in line with that channel, adapted to communicate with the remaining tube. Channel 33 is connected via a pipe 35 to a source of reduced pressure, such as a pump 42, and a sugar separator 40 (described below). Port 34 is connected via a pipe 36 to a source of fluid (e.g. air) under pressure, not shown. Distributing head 14' (FIG. 4) comprises a pair of semiannular channels 33a' and 33b' communicating respectively with a pair of pipes 35a' and 35b', each of which leads by way of a respective separator 40a', 40b' to a reduced-pressure source 42a, 42b', and a port 34' connected to a source of pressure fluid (not shown) by a pipe 36'. The well 16 is further provided with a spray nozzle 37, adapted to introduce a diluent fluid to facilitate converting collected sludge into a homogeneous slurry.

The operation of the apparatus according to my invention may be more readily understood with reference to the schematic showing in FIG. 5. A slurry composed of thick sugar sirup, containing a suspension of sugar granules and of insoluble products such as lime precipitated by carbon dioxide and carbon, is admitted through the pipe 31 into the compartment 2 of tank 1. The reduced pressure produced in pipe 35 by pump 42 draws a filtrate containing sugar sirup through the filtering surfaces 9a, 9b in the charging and filtering station into chambers 10 and thence through tubes 11 and 12 into channel 33. From this channel, the pipe 35 conducts the filtrate to the sugar separator 40 which may advantageously be an evaporator-and-condenser combination wherein the filtrate is evaporated to yield a crystallized sugar product (the so-called "first" sugar), waste liquors and molasses. As the shaft 5 is rotated, the sectors 7 formerly at the filtering station pass between the spray nozzles 28 of the washing station wherein a wash liquid or lixiviant, preferably one recovered from stage B so as to be pre-enriched with sugar sirup, is sprayed upon the filter cake adhering externally to the screens of these sectors. The wash liquid leaches the residual sugar out of the cake and carries it through the filters and via pipe 35 to the sugar separator 40 described above.

From the washing zone the sectors 7 are rotated to the discharge station where they are inflated by the introduction of air under pressure from a pipe 36 through port 34 and tubes 12 into the chambers 10 of these sectors. As their screens expand, they are scraped by the blades 19 whereby the filter cake thereon is removed, broken up and dumped into the well 16. There its fragments are sprayed by the nozzle 37 with a diluent recovered from stage B, via separator 40a' and pump 42a', to form a new slurry containing substantially less sugar than the slurry introduced through pipe 31. The new slurry is transferred through pipe 17 to compartment 3 by the combined transfer and agitating operation of the vanes 20 which produces a substantially homogeneous mass at the input of the second filtering stage.

The action of the vanes 23 in well 18 brings the slurry into contact with the filter faces 9a', 9b' of sectors 7' in compartment 3. A filtrate containing relatively minor quantities of sugar is sucked under reduced pressure through the filter screens into the chambers 10' of the sectors 7' at the charging station of compartment 3. From chambers 10' the filtrate is drawn through tubes 11', 12' into channel 33b' and thence via pipe 35b' to the sugar separator 40b' from which a portion of the liquid, still containing some sugar, is returned to the pipe 30 as the lixiviant of stage A for further enrichment at the washing station of that stage. The sectors 7', now coated with filter cake, are then rotated to the washing or leaching station at which they are sprayed with fresh water entering through pipe 30' (or with a wash liquor recirculated from successive filtering stages not shown). The juice drawn through the filter under reduced pressure is conducted through channel 33a' and pipe 35a' to the separator 40a' from which a portion of the liquid is returned to well 16 by spray nozzle 37.

Regulating valves 47 are provided in the outlets of pumps 42a', 42b' to control the recirculation of the low-sugar liquors from separators 40a', 40b' through conduits 30, 37 for re-use as a diluent and a lixiviant in stage A. These liquors, containing large quantities of lime, may also be used as white wash and can be recovered for such purpose from a bypass 48, particularly if an excess of water is used initially at the inlet 30'.

The sectors next pass through the drying station at which the filter cakes, leached of their sugar, are dried under the partial vacuum produced by pump 42a'. At the subsequent discharging station the filter sectors 7' are inflated by compressed air, introduced through the port 34' of the distributing head 14' via pipe 36', whereby the filter cakes are easily removed by the scrapers 19' into drain 26 from which the insoluble matter may be discarded at will or recovered to salvage valuable byproducts.

From the foregoing disclosure it will be clear that the apparatus according to my invention, by extracting from the original sirup three different juices at 35, 35a', 35b') from which sugar-rich fractions can be recovered by the separators 40, 40a' and 40b', has a greatly increased yield compared with conventional equipment of this type. This staggered recovery correspondingly minimizes the risk of imperfect utilization of the treated material by reason of local inadequacy of filtering action. Naturally, it is also possible to modify head 14 along the lines of head 14' so that the juice from stage A will also be drawn off over two different channels and separators as the output of the charging station and of the washing station, respectively, of that stage.

It will be apparent that many of the mechanical details of the filter-washer herein disclosed may be modified without deviating from the spirit and scope of the present invention, except as further defined in the accompanying claims.

I claim:

1. An apparatus for refining sugar sirup, comprising a tank subdivided into a first and a second compartment, a first filter element in said first compartment, a second filter element in said second compartment, said filter elements being provided with a common, substantially horizontal shaft, inlet means for admitting a sirup to be treated into said first compartment, first stripper means at said first compartment for removing adhering solids from the surface of said first filter element, transfer means extending between said compartments for delivering the removed solids together with a diluent fluid to said second compartment as a slurrry, drive means for moving said filter elements into and out of said sirup and said slurry, respectively, by rotating said shaft, first spray means adapted to direct a lixiviant at said first filter element upon its emergence from said sirup, second spray means adapted to direct water at said second filter element upon its emergence from said slurry, first suction means communicating with said first filter element in positions both above and below the level of said sirup for drawing a first juice through said first filter element, second suction means communicating with said second filter element in a position below the level of said slurrry for drawing a second juice through said second filter element and delivering at least part of said second juice to said first spray means as the lixiviant, third suction means communicating with said second filter element in a position operatively aligned with said second spray means for drawing a third juice through said second filter element and delivering at least part of said third juice to said transfer means as the diluent fluid, separator means for removing a sugar-rich fraction from each of said juices, second stripper means at said second compartment for removing adherent solids from the surface of said second filter element, and conduit means for delivering said fraction to a point of utilization.

2. An apparatus according to claim 1, comprising a plurality of first and second filter elements in said first and second compartment, respectively, said first filter elements constituting individually removable sectors of a first filter disk on said shaft, said second filter elements constituting individually removable sectors of a second filter disk on said shaft.

3. An apparatus according to claim 1 wherein said transfer means comprises a rotatable agitator having vanes adapted for intimately mixing said diluent fluid with the solids removed by said first stripper means.

4. An apparatus according to claim 1 wherein each of said stripper means includes a source of pressure fluid communicating with the respective filter element in a position in which the latter is disconnected from the respective suction means, each of said stripper means further including a stationary blade, each filter element comprising a filter screen adapted to be driven against said blade by the pressure fluid.

5. An apparatus for refining sugar sirup, comprising a tank subdivided into a first and a second compartment, a first filter element in said first compartment, a second filter element in said second compartment, inlet means for admitting a sirup to be treated into said first compartment, first stripper means at said first compartment for moving adhering solids from the surface of said first filter element, transfer means extending between said compartments for delivering the removed solids together with a diluent fluid to said second compartment as a slurry, drive means for moving said filter elements into and out of said sirup and said slurrry, respectively, first spray means adapted to direct a lixiviant at said first filter element upon its emergence from said sirup, second spray means adapted to direct water at said second filter element upon its emergence from said slurrry, first suction means communicating with said first filter element in positions both above and below the level of said sirup for drawing a first juice through said first filter element, second suction means communicating with said second filter element in a position below the level of said slurry for drawing a second juice through said second filter element and delivering at least part of said second juice to said first spray means as the lixiviant, third suction means communicating with said second filter element in a position operatively aligned with said second spray means for drawing a third juice through said second filter element and delivering at least part of said third juice to said transfer means as the diluent fluid, separator means for removing a sugar-rich fraction from each of said juices, second stripper means at said second compartment for removing adherent solids from the surface of said second filter element, and conduit means for delivering said fraction to a point of utilization.

References Cited in the file of this patent

UNITED STATES PATENTS

| 403,073 | Rabitz | May 7, 1889 |
| 1,264,635 | Graham | Apr. 30, 1918 |
| 2,362,231 | Ackerly | Nov. 7, 1944 |
| 2,362,300 | Nyman | Nov. 7, 1944 |

OTHER REFERENCES

Chemical and Metallurgical Engineering, January 1944, pp. 117–124.

Perry: Chemical Engineers' Handbook, 3rd ed., 1950, pp. 970–980.